April 22, 1969  V. A. PULLOS  3,439,537
UNDERWATER VEHICLES
Filed Nov. 15, 1965  Sheet 1 of 2
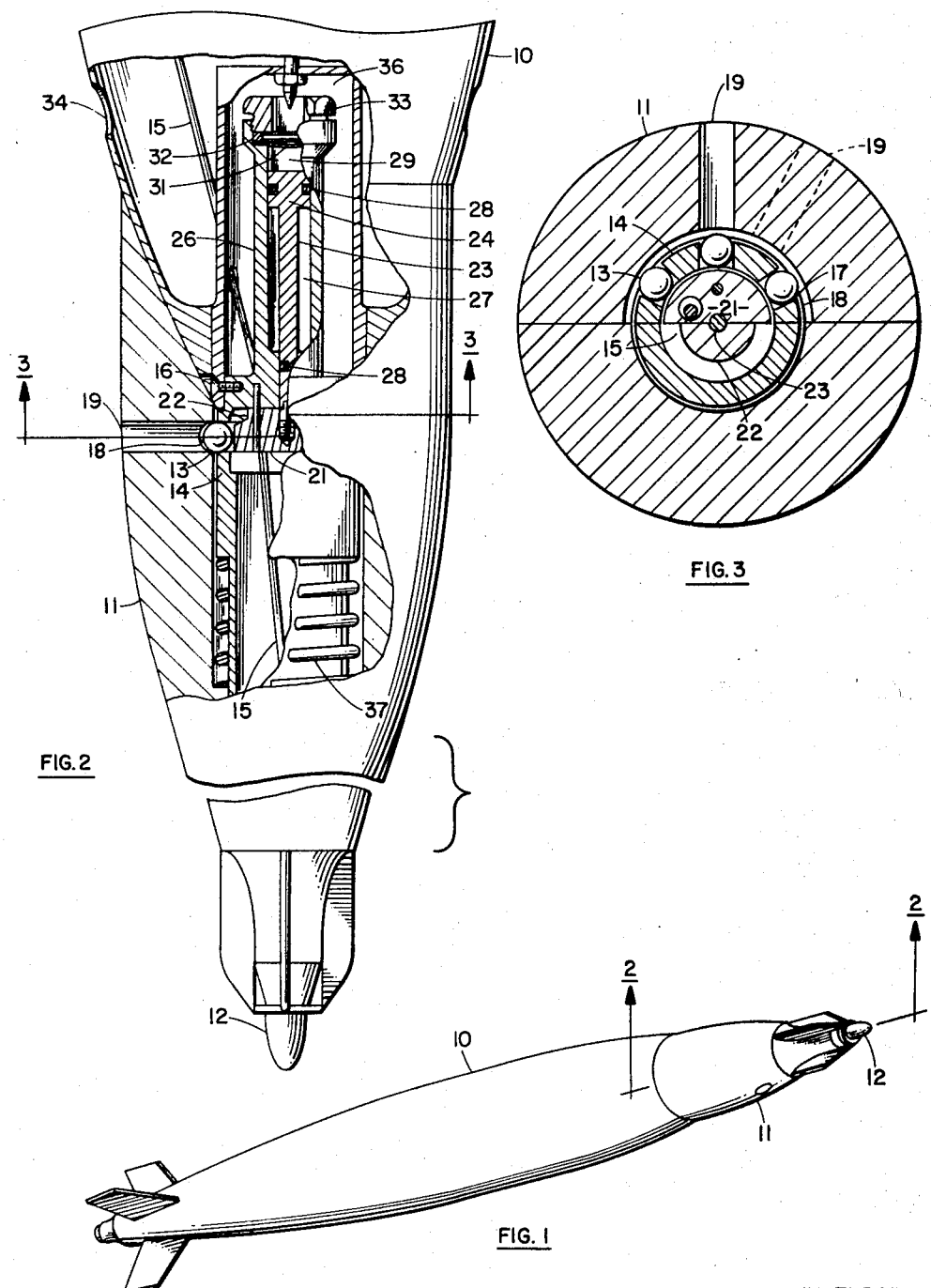
INVENTOR
VLASH A. PULLOS
BY *Richard D. Seibel*
ATTORNEY April 22, 1969  V. A. PULLOS  3,439,537
UNDERWATER VEHICLES Filed Nov. 15, 1965  Sheet 2 of 2

INVENTOR.
VLASH A. PULLOS
BY *Richard D. Seibel*
ATTORNEY

United States Patent Office 3,439,537
Patented Apr. 22, 1969

3,439,537
UNDERWATER VEHICLES
Vlash A. Pullos, Garden Grove, Calif., assignor to North American Rockwell Corporation
Filed Nov. 15, 1965, Ser. No. 507,904
Int. Cl. G01n 1/00
U.S. Cl. 73—170                                14 Claims

ABSTRACT OF THE DISCLOSURE

An unmanned underwater vehicle for carrying oceanographic instruments provided with means for controlling its vertical motion in response to changes in depth. An actuator is described having a piston dividing a cylinder into two chambers. A frangible diaphragm communicating with one of the chambers is burst by underwater pressure thereby providing a single rapid forceful movement of the piston. In one embodiment the piston motion releases ball detents for releasing ballast from an underwater vehicle. In another embodiment check valves provide for rupture of the frangible disk on decreasing pressure and motion of the piston releases a sea anchor for preventing damage to a pop-up vehicle. In a third embodiment the piston is connected to a hollow tube which is driven into the ocean floor upon rupture of the diaphragm for obtaining bottom samples.

---

In many operations beneath the surface of the ocean or other bodies of liquid it is often desirable to obtain a forceful motion to perform useful work. Thus it may be desirable to release ballast from an underwater vehicle to cause the vehicle to rise to the surface. It may be desired to cut cables or other structures or it may be desirable to pierce the ocean floor in order to obtain a sample thereof. It may also be desirable to actuate an electrical switch or other device at a selected condition. In any of these instances a single rapid operation of a unit is required rather than a series of repetitive operations. In the past such operations have been conducted by the use of compressed gases, gravity actuation or explosive charges. Each of these are subject to certain limitations or dangers in operation. Thus, for example, gravity operated devices are limited in the total force applied and also in the rate at which force can be applied. Actuators employing compressed gases or explosives are dangerous for handling on shipboard. Other pressure operated actuators give a relatively slow motion that is impractical for many desired operations.

It is therefore a broad object of this invention to provide a safe reliable actuator for underwater operations.

Thus in the practice of this invention according to a preferred embodiment there is provided an actuator comprising a housing having a cylindrical bore and a piston within the bore of the housing dividing the bore into two separate chambers. One of the chambers is closed by a frangible burst diaphragm in the housing and the other chamber is closed by conventional fluid seals. A shaft is secured to the piston and passes to the exterior of the housing and a ball retainer is secured to the shaft outside of the housing. A plurality of balls in a ball cage surrounding the retainer are employed for securing ballast to an underwater vehicle. The actuator is assembled at the surface of the ocean so that air trapped within the chambers of the actuator is at substatnially atmospheric pressure. When the actuator is lowered beneath the surface of the ocean the perssure on the diaphragm increases with increasing depth. At a selected depth having a pressure corresponding to the strentgh of the diaphragm, the diaphragm ruptures admitting ocean perssure to the chamber on one side of the piston within the housing. This ocean pressure causes the air trapped within the other chamber formed by the piston in the housing to be compressed, thereby stroking the piston within the bore and in a preferred embodiment moving the ball retainer away from contact with the balls thereby releasing the ballast.

Thus it is a broad object of this invention to provide an actuator for obtaining a forceful motion beneath a body of liquid.

It is a further object of this invention to provide a means for releasing ballast in an underwater vehicle.

Other objects and many of the attendant advantages of this invention will be readily appreciated as the same becomes better understood by reference to the following detailed description when considered in connection with the accompanying drawings wherein:

FIG. 1 illustrates an underwater vehicle incorporating the principles of this invention;

FIG. 2 illustrates a partial cross-section of the vehicle of FIG. 1;

FIG. 3 is a staggered cross-section of the vehicle of FIG. 2;

Throughout the drawings like numerals refer to like parts.

Figure 5:
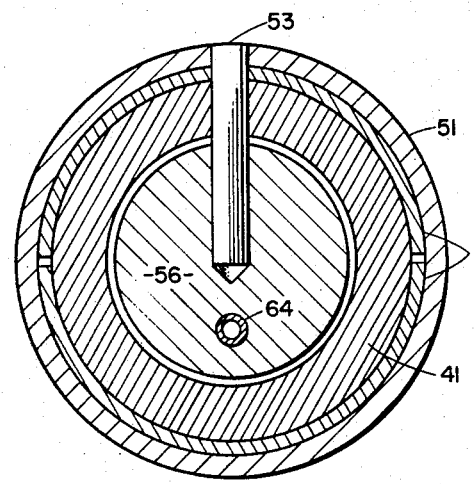
FIG. 5 illustrates a transverse cross-section of a portion of the vehicle of FIG. 4.

FIGS. 1–3 illustrate an underwater vehicle having ballast released by an actuator constructed according to the principles of this invention. As illustrated in this embodiment there is an underwater vehicle having a streamlined body 10 of circular cross section for travel through the ocean with a minimum of turbulence. The vehicle illustrated in FIG. 1 is, for example, an oceanographic research instrument that is released from a ship to sink toward the bottom of the ocean and obtain measurements of turbulence, temperature, and other variables as it sinks. In a vehicle of this sort data is measured and stored on tape, for example, during sinking and in order to utilize the data it is necessary to recover the vehicle with the stored data therein. Recovery can be made by attaching a tether line to the vehicle and drawing it to the surface at the end of a test run. This technique, however, suffers from difficulties in paying out the tether at a uniform rate and the steadily increasing length of tether being drawn through the water increases the water friction and tends to slow the sink rate of the vehicle. It is therefore desirable that the underwater vehicle be free to sink and that a reliable provision be made to release ballast so that the vehicle becomes buoyant and floats to the surface after reaching a selected depth.

Thus in the vehicle in FIGS. 1 and 2 near the forward end therefore there is provided a streamlined ballast piece 11 fitted around a portion of the body 10 of the vehicle. The center of buoyancy of the vehicle is located so that the portion having the ballast is downward during sinking. It is preferred that the ballast 11 have a central passage so that measuring instruments and the like can be positioned in front of the ballast for obtaining measurements of water conditions in advance of any turbulence or other disturbances set up by the sinking of the vehicle. In the illustrated vehicle there is provided an instrument package 12 on the nose of the vehicle with an electronic connection 15 passing to the main body of the vehicle so that data obtained can be recorded by a tape recorder (not shown) within the body of the vehicle. The ballast 11 is in the form of an elongated ring fitting on the body 10 of the vehicle forward of the main body of the vehicle and aft of the instrument package 12. It is preferred that the ballast be machined from a piece of steel or cast iron for purposes of economy, however, it will be apparent that lead or other heavy materials can also be used for ballast. The weight and gas containing volume of the vehicle are selected so that with the ballast 11 in place as shown in FIG. 2 the entire vehicle has a negative buoyancy so that it sinks toward the bottom of the ocean. With the ballast released as described hereinafter the vehicle has positive buoyancy and floats toward the surface of the ocean.

As illustrated in FIGS. 2 and 3 in order to secure the ballast 11 to the body 10 of the vehicle there are a plurality of balls 13 within a ball cage 14 that is secured to the body of the vehicle by a series of bolts 16. The ball cage 14 comprises a cylindrical housing having a plurality of radial apertures 17 for receiving the balls 13. These apertures are slightly larger than the balls so that the balls are relatively free to move therein. A circumferential groove 18 on the interior of the ballast 11 accommodates a side of the balls 13. The balls extend beyond the exterior of the ball cage 14 so as to engage the interior groove 18 of the ballast and prevent the ballast 11 from moving relative to the ball cage 14. A single radial hole 19 in the ballast permits assembly of the balls into the ball cage. The ballast is rotated so that the hole 19 is aligned with one of the apertures 17 in the ball cage 14 and a ball 13 inserted. This operation is repeated until all of the balls are in the ball cage and the ballast is secure. The ballast is then rotated to the position shown in phantom in FIG. 3 before use. It is found sufficiently difficult to rotate the ballast that balls have never come out of the hole 19 in use of the vehicle. Even if a ball were lost, sufficient balls remain to keep the ballast in place.

Within the ball cage 14 and in contact with the balls 13 is a ball retainer 21. The ball retainer in the position shown in FIG. 2 prevents the balls from moving inwardly relative to the ball cage so as to be out of engagement with the ballast 11. A rebated portion 22 on the periphery of the ball retainer 21 opens up a space so that when the ball retainer is moved longitudinally relative to the ball cage (downwardly in FIG. 2), the balls can move inwardly into the rebated portion and out of engagement with the ballast 11.

The ball retainer 21 is secured onto a shaft 23 attached to a piston 24 that is slidably mounted in the cylindrical bore of a housing 26 secured to the ball cage 14. The piston and the housing cooperate to define a first chamber 27 that is sealed by O-rings 28 or similar seals. On the other side of the piston 24 from the chamber 27 is a second chamber 29 that is defined by one face of the piston 24, the housing 26 and a burst diaphragm 31. The burst diaphragm 31 is a conventional frangible diaphragm that has a diameter and thickness so that the diaphragm ruptures at a selected pressure differential thereacross. The diaphragm is held in place within the housing 27 by a spacer 32 and a threaded nut 33. Vents 34 are provided in the body of the vehicle so that the pressure of the ocean is transmitted within the body to a chamber 36 outside of the housing 26 and the diaphragm 31. Thus the ocean pressure is applied against one side of the diaphragm 31.

In order to operate the underwater vehicle as described and illustrated in FIGS. 1–3, the ballast 11 is secured onto the body 10 by the balls 13 and the ball retainer 21 and piston 24 and the rupture diaphragm 31 are positioned as illustrated in FIG. 2 while the assemblage is above the surface of the ocean. By this means the chambers 27 and 29 are closed containing air at substantially atmospheric pressure. When the vehicle is lowered into the ocean and released to sink therethrough the external pressure increases at a rate of approximately one-half p.s.i. per foot of depth. This ocean pressure increases in the chamber 36 and acts upon the diaphragm 31 creating a pressure differential thereacross since the pressure in the chamber 29 remains at substantially one atmosphere.

When the pressure differential exceeds the burst strength of the frangible diaphragm 31 at some selected depth beneath the surface, the diaphragm ruptures thereby admitting ocean pressure to the chamber 29 adjacent the face of the piston 24. This ocean pressure acts on the piston, rapidly stroking it and compressing the gas within the chamber 27. A substantial force is involved because of the relatively high ocean pressure on one face of the piston opposing the relatively low pressure in the chamber 27 on the other face of the piston. This force causes a motion of the piston within the housing 26 and consequently a sudden motion of the ball retainer 21 along the axis of the vehicle. As the ball retainer 21 strokes toward the forward end of the vehicle the balls 13 are cammed by the ballast 11 and move inwardly into the rebated portion 22 thereby releasing the ballast and permitting it to fall free from the body 10. The ballast is sufficiently heavy to disengage from the body under the influence of gravity, however, in order to assure reliable operation a compression spring 37 is mounted between the vehicle body and the ballast to assist in ejecting the ballast from the body. After the ballast is ejected it continues to sink toward the bottom of the ocean and the body 10, now having positive buoyancy, floats to the surface for recovery.

In a typical application a piston $11/16$ inch diameter is employed with a ¼ inch diameter shaft to the ball retainer. At a depth of 450 feet an actuator of this size develops an initial force in excess of 60 pounds which is more than adequate to remove the restraint from the balls and release the ballast. It is apparent that many modifications of the described and illustrated structure are possible.

Figure 4:
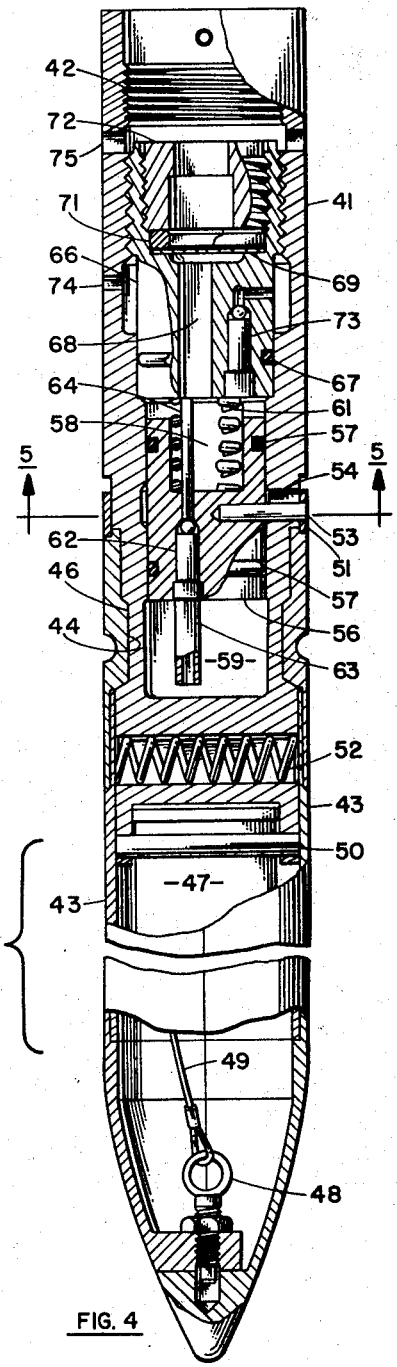
FIG. 4 illustrates in partial cross-section an underwater vehicle employing an actuator constructed according to the principles of this invention for obtaining forceful motion as the vehicle rises toward the surface of a body of liquid.

FIGS. 4 and 5 illustrate a second embodiment of an underwater actuator incorporating the principles of this invention. The vehicle illustrated in FIG. 4 is particularly useful in a so-called pop-up situation. In certain instances it is desirable to release a vehicle beneath the surface of the ocean to float toward the surface, for example, the research vehicle of the preferred embodiment is released to float upward when the ballast is ejected. It is found with buoyant bodies, however, that they accelerate as they approach the surface and if released from substantial depths obtain sufficient velocity to leap high above the surface of the water and may suffer severe damage upon falling back into the water. In order to minimize the possibility of damage to a vehicle that is designed to pop up from below the surface, it is desirable to deploy a sea anchor or "water parachute" to minimize the velocity as the vehicle approaches the surface. In many instances, however, it is desirable to have a vehicle rise most of the way toward the surface at a rapid rate with the sea anchor being deployed only near the surface. The vehicle illustrated in FIG. 4 provides a means for releasing a sea anchor in a pop-up vehicle as it approaches the surface of the ocean.

As illustrated in FIG. 4 there is provided a body 41 that is readily secured to the bottom end of a variety of pop-up vehicles by a threaded fitting 42 so that the body 41 trails the vehicle and points toward the ocean bottom as the vericle floats up. A canister split along its length to form two semicircular halves 43 fits around the body 41 at the bottom end thereof and has an internal shoulder 44 fitted into a corresponding rebated portion 46 in the body 41. The canister is a relatively long body containing a conventional sea anchor 47 shown schematically in FIG. 4, that is secured to the body 41 by a pin 50 or the like. The canister is split longitudinally into two segments that are secured together at the aft or bottom end thereof by a bolt 48. It is preferred that the bolt 48 be an eye bolt secured to the balance of the vehicle by a wire or cable 49 so that the canister is not lost during use of the vehicle.

At the forward end of the canister a sleeve 51 surrounds the ends of the two halves 43 to secure them together in the form of a cylinder and keep the internal shoulder 44 engaged with the groove 46. A spring 52 inside the canister and on the body 41 is arranged to give a substantial outward force on the two halves of the canister urging these halves towards disengagement from the body 41. The disengagement is restrained by the sleeve 51 surrounding the ends of the two halves of the canister. A pin 53 in a hole in the sleeve 51 passes through an elongated slot 54 in the body 41 and engages with a piston 56 within the body. This pin secures the sleeve 51 to the piston 56 so that motion along the length of the body 41 of these two elements occurs together. The piston 56 is slidably mounted within the body 41 and has its sides sealed thereto by O-rings 57. Two O-rings 57 are provided on the piston, one on either side of the slot 54, so that ocean pressure is prevented from entering the body 41 except between the two O-rings.

The piston 56 divides the interior of the body 41 into first and second chambers 58 and 59 respectively. A spring 61 in the first chamber 58 biases the piston 56 toward the aft end of the vehicle so that the sleeve 51 is retained in engagement with the halves 43 of the canister. Within the body of the piston 56 there is a check valve 62 permitting flow of fluid from the first chamber 58 to the closed second chamber 59 and preventing reverse flow. A tubular extension 63 on the check valve retainer extends into the closed chamber 59 and a tube 64 extends from the check valve 62 into the first chamber 58.

A plug 66 is threaded into the body 41 and a fluid seal therebetween is provided by an O-ring so that the chamber 58 is sealed from ocean pressure except as hereinafter described. The plug 66 contains a passage 68 therethrough that is closed by a conventional frangible diaphragm 69 that is secured to the plug 66 by a spacer 71 and a threaded nut 72. Also within the plug 66 is a check valve 73 communicating with external pressure by way of a vent 74 and also communicating with the chamber 58. The check valve 73 is oriented so that external fluid can enter by way of the vent 74 to the chamber 58 but reverse flow is prevented. External pressure is transmitted to the diaphragm 69 by way of a vent 75 in the body 41.

In the use of the pop-up vehicle described and illustrated in FIG. 4 the assembly is made in the manner illustrated in FIG. 4 at the surface of the ocean. Thus the first and second chambers 58 and 59 are closed so as to contain air at substantially atmospheric pressure. The body 41 is then secured to a sink vehicle or other body to be used below the surface of the ocean by means of the threads 42. The entire assembly is then permitted to sink toward the bottom of the ocean with the body and canister lower than the vehicle to which it is secured. The vehicle may also be taken below the surface by submarine or other means for later release. As the vehicle sinks in the ocean, water at ocean pressure is admitted to the chamber 58 by way of the check valve 73 thereby increasing the pressure in the chamber. This pressure in turn opens the check valve 62 in the piston permitting air to flow from the chamber 58 to the chamber 59. The tube 64 extending upwardly from the piston 56 assures that air in the chamber 58 is transferred to the chamber 59 and minimizes the flow of water into the latter chamber. Thus as the vehicle sinks toward the bottom of the ocean the pressure of the fluid within the chamber 58 and of gas within the chamber 59 is substantially that of the ocean outside of the vehicle.

When some selected condition or depth is met, the pop-up vehicle is released and commences to float toward the surface of the ocean. As the pressure external to the vehicle decreases the check valves 62 and 73 close to maintain the elevated pressure in the chambers 59 and 58 respectively. The tubular extension 63 extending downward from the check valve 62 assures that any minor leakage occurring in the check valve 62 will transfer water from the chamber 59 rather than air if any water is present. Thus the tubular extensions 63 and 64 are provided so that a maximum volume of air as opposed to water is contained in the chamber 59 since the air therein that has been compressed by ocean pressure represents stored energy useful for obtaining forceful motion and incompressible water does not add to the stored energy.

As the vehicle approaches the surface the pressure in the chambers 58 and 59 acts on the diaphragm 69 by way of the passage 68 through the plug. When the differential of contained pressure over the pressure external to the vehicle exceeds the strength of the diaphragm it ruptures, thereby relieving the pressure in the chamber 58 down to the external pressure. The difference in pressure across the piston 56 causes it to move rapidly towards the plug 66. This motion is transmitted by way of the pin 53 to the sleeve 51 thereby sliding the sleeve 51 relative to the body 41 and releasing the constraint on the ends of the two halves 43 of the canister. The spring 52 forces the two halves of the canister apart releasing the internal shoulder 44 from the dentent 46 and permitting the canister halves to fall away from the body 41. This exposes the sea anchor 47 that is deployed in a conventional manner to provide substantial drag on the pop-up vehicle to prevent the vehicle from leaping above the surface of the ocean. The canister is connected to the sea anchor by the cable 49 and is recovered along with the rest of the vehicle. It will be apparent also that the canister itself can be constructed as a series of petals to provide a drag apron that is released in the same manner as the described canister. It will also be apparent that a check valve can be located in the body of the vehicle for communication between the exterior of the vehicle and the chamber 59 in lieu of the check valve 62 in the piston.

Figure 6:
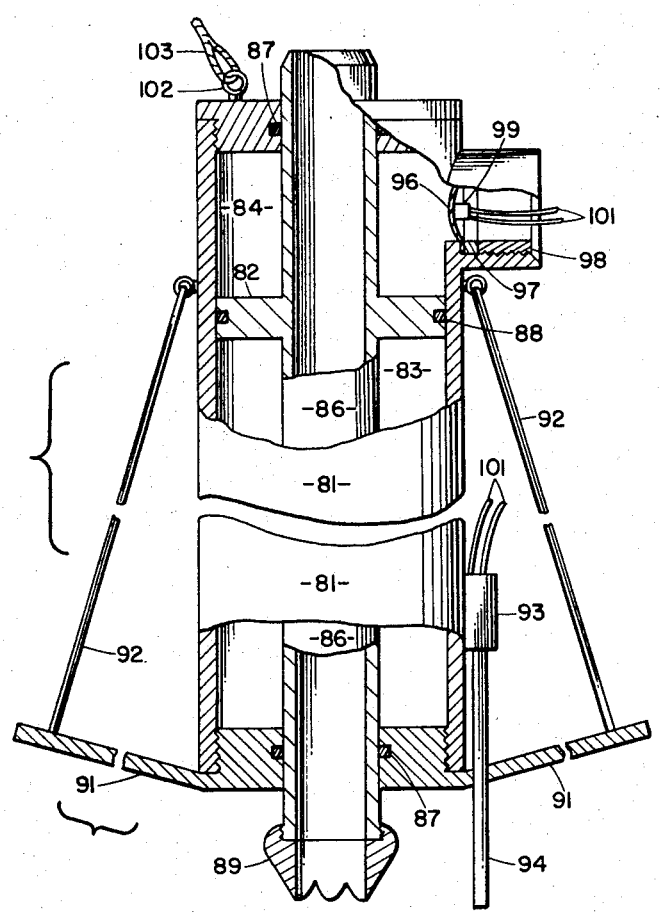
FIG. 6 illustrates in cross-section a core sampler for obtaining samples of the ocean floor.

FIG. 6 illustrates a core sampler constructed according to the principles of this invention for obtaining a long core from an ocean bottom or the like. As illustrated in this embodiment there is provided a cylindrical housing 81 within the bore of which is a slidably movable piston 82 that serves to divide the interior of the housing into a first gas filled chamber 83 and a second chamber 84. An elongated core tube 86 is formed on the piston so as to extend along the axis thereof from both sides of the piston and through the ends of the housing 81. The bore of the core tube 86 extends through the piston. O-ring seals 87 are provided between the core tube and the housing 81 to prevent ocean pressure from entering the chambers 83 and 84 respectively. In addition an O-ring seal 88 on the piston 82 prevents leakage between the two chambers 83 and 84. A conventional piercing point 89 of hardened, sharpened material is threaded on the end of the core tube 86 at the bottom thereof for piercing the ocean floor and recovering a core therefrom.

The lower end of the housing 81 has a drag apron 91 formed as an integral part thereof. It should also be noted that the drag apron 91 can comprise a plurality of segments hinged to the housing 81 in order to obtain better sinking characteristics. Cables or wires 92 are connected between the housing 81 and the drag apron 91 to serve as strengthening for the drag apron during use of the core sampler.

Also attached to the housing near the bottom is a contact switch 93 that is actuated by a rod 94 extending through the drag apron 91 to a point somewhat beyond the piercing point 89 on the core tube. The switch 93 in actuated by pressure on the end of the rod 94 as hereinafter described.

At the upper end of the housing 81 and transverse to the length thereof is a side opening that is sealed by a frangible diaphragm 96. The diaphragm is secured in place against the housing by a spacer 97 and a threaded nut 98. An electrically fired explosive detonator 99 is cemented or otherwise attached to or near the diaphragm 96 to provide an extra pressure wave when desired. The detonator is electrically connected to the switch 93 and a battery (not shown) by means of wires 101 so that upon closing of the switch 93 the explosive detonator is fired. It will also be apparent that a solenoid driven punch could pierce the diaphragm to initiate rupture.

An eye bolt 102 is attached to the upper end of the housing 81 and a cable 103 is secured to the eye bolt so that the core sampler can be recovered from the ocean bottom after use. It may also be desirable in some embodiments to employ a drag device such as a sea anchor on the cable 103 at some point above the core sampler to assure that the core sampler sinks toward the bottom in a substantially upright position.

In order to operate the core sampler described and illustrated in FIG. 6, the piston 82 is positioned in the housing 81 as illustrated in FIG. 6. This operation and sealing of the diaphragm 96 are done at the surface of the ocean so that the chambers 83 and 84 are both filled with air at substantially atmospheric pressure. If it is desired, the chamber 84 can be filled with a fluid other than air, such as water, however, it is preferred to fill the chamber 84 with air to maintain the center of buoyance high and assure sinking in an upright position.

After assembly the core sampler is lowered or permitted to sink to the bottom of the ocean and when contact is made with the bottom by the rod 94 the switch 93 is closed thereby igniting the explosive detonator 101. The pressure wave generated by the explosive detonator, added on to the hydrostatic pressure due to the head of water above the core sampler, is sufficient to rupture the frangible diaphragm 96. This admits ocean pressure to the chamber 84 so that the ocean pressure can act on the face of the piston 82. This forces the piston 82 downwardly against the air in the chamber 83 thereby compressing the air and driving the core tube 86 downwardly through the housing. Due to the substantial weight of the housing relative to the core tube and also due to the high drag of the drag apron 91, the piercing point 89 is driven into the ocean floor, thereby cutting a core that is collected within the bore of the core tube 86. Water within the core tube 86 is expelled from the top thereof and if it is desired a screen or other restriction can be placed at the top to prevent the loss of loose solid material associated with the core. It is found that the very high drag of the drag apron 91 substantially prevents any upward motion of the core sampler during stroking of the piston and driving of the core tube into the ocean bottom since the time required for the piston to stroke is relatively short. A high load is imparted to the drag apron 91 and the cables 92 are provided to prevent the drag apron from being broken off at the housing. After the core tube 86 has been driven into the ocean floor and a core collected, the entire assembly is lifted by means of the cable 103 and returned to the vessel from which it was dropped. The core is then readily removed for study.

In a typical core sampler the core tube has a 2½ inch outside diameter and the piston has an inside diameter of six inches. At a pressure of 200 p.s.i. corresponding to a depth of about 450 feet the core sampler develops an initial force of about 21,600 pounds, and even at 90% of the stroke the driving force on the piston is in excess of a ton. The forces are proportionally larger at greater depths and other proportions of core tube and piston can be employed to give a suitable force at any selected depth. It is found with a device of this sort that core samples as long as twenty feet can be obtained in ocean bottoms comprising typical silt and mud.

It will be apparent that in lieu of a tube extending from the piston out of the bottom end of the housing, a rod can be employed. Such a rod, driven into the mud of the bottom provides an excellent anchor since it is quite resistant to lateral forces. Such an anchor can be withdrawn by a vertical lift, or can be left implanted in the bottom. Similarly, a plurality of parallel rods can be employed in an anchor or "barbed" ends can be provided on the rods to resist vertical withdrawal from the ocean bottom.

It will be apparent to one skilled in the art that many substitutions, modifications, and variations can be made in light of the above teachings.

What is claimed is:

1. An apparatus comprising:
  a housing having a cylindrical bore;
  a piston movably mounted in the bore of said housing sealably dividing the bore into a first closed chamber on one side of said piston and a second closed chamber on the other side of said piston;
  a frangible diaphragm in said housing adjacent the second chamber for excluding external pressure from the second chamber, said diaphragm being rupturable at a selected pressure for admitting external pressure to said second chamber so that the external pressure acts on said piston for changing the compression of the gas in the first chamber and obtaining a single rapid forceful movement of said piston;
  a member detachably connected to said housing; and
  means actuated by said piston for effecting detachment of said member from said housing, said means comprising:
    latch means temporarily securing said member to said housing; and
    means on said piston for releasing said latch means upon movement of said piston.

2. An underwater apparatus for a pop-up vehicle including an apparatus as defined in claim 1 further comprising:
  a first check valve for admitting underwater pressure through the housing to the first chamber and oriented so that deeper water pressure is retained in the first chamber as the actuator rises to shallower depths; and
  a second check valve for admitting underwater pressure to the second chamber and oriented so that deeper water pressure is retained in the second chamber as the actuator rises to shallower depths.

3. An underwater release mechanism comprising:
  a housing having a cylindrical bore;
  a piston movably mounted in the bore of said housing sealably dividing the bore into a first closed chamber on one side of said piston and a second closed chamber on the other side of said piston;
  a frangible diaphragm in said housing adjacent the second chamber for excluding external pressure from the second chamber, said diaphragm being rupturable at a selected pressure for admitting external pressure to said second chamber so that the external pressure acts on said piston for changing the compression of the gas in the first chamber and obtaining a single rapid forceful movement of said piston;
  a member detachably connected to said housing;
  means actuated by said piston for effecting detachment of said member from said housing, said means for effecting detachment comprising:
    a shaft attached to said piston for movement therewith and extending outside of said housing bore;
    a ball retainer on said shaft, said ball retainer including a rebated portion;
    a ball cage secured to said housing adjacent said ball retainer including an aperture;
    a ball in the aperture in said ball cage; and
    means for urging said ball toward said ball retainer whereby said ball is contained in the aperture in said ball cage by said ball retainer before rupture of said frangible diaphragm and movement of said piston, and said ball is urged from the aperture into the rebated portion after rupture of said frangible diaphragm and movement of said piston.

4. An underwater release mechanism as defined in claim 3 wherein said means for urging comprises a camming ball engaging surface on said member for urging said ball toward said ball retainer in response to weight of said member, said member being secured to the release mechanism only by said ball so that said member is released when said ball moves from the aperture after rupture of said frangible diaphragm.

5. An underwater vehicle comprising:
a streamlined body having positive buoyancy;
a cylindrical housing having at least a portion extending forward of said streamlined body including a plurality of radial apertures in a circumferential array;
a hollow streamlined ballast member around said housing, said ballast member having a negative buoyancy greater than the positive buoyancy of said body, said ballast member including an internal circumferential rebated portion and a radial hole extending through the side of said ballast member from the circumferential groove;
a spring between said housing and said ballast member urging said ballast member away from said body;
a cylinder in said housing;
a piston slidably mounted in said cylinder so that one side of said piston and the cylinder wall define a first closed chamber within said cylinder;
a fluid seal between said piston and the wall of said cylinder;
a shaft on said piston extending out of said cylinder;
a fluid seal between said shaft and the end of said cylinder;
a ball retainer on said shaft comprising a larger cylindrical surface adjacent the apertures in said housing when the piston and ball retainer assembly is in a first axial position, and a smaller cylindrical surface adjacent the apertures in said housing when the piston and ball retainer assembly is in a second axial position;
a plurality of balls, one of said balls being in each of the apertures in said housing, each of said balls bearing on the larger cylindrical surface of said ball retainer in the first axial position thereof and extending radially beyond said housing into the internal rebated portion of said ballast member, whereby said ballast member is secured to said housing, and each of said balls being accommodated between the smaller cylindrical surface and the exterior of said housing with the ball retainer in the second position thereof whereby said ballast member is released from said housing; and
a frangible diaphragm in said cylinder one side of which at least partially defines a second closed chamber within said cylinder and on the other side of said piston from said first closed chamber, said frangible diaphragm being rupturable at a selected pressure differential thereacross, the side of said frangible diaphragm opposite from said second closed chamber being in fluid communication with the exterior of said body.

6. An underwater vehicle comprising:
a generally cylindrical hollow housing having an open forward end and a closed aft end, an external circumferential rebated portion near the aft end of said housing, and a radial slot through one side of said housing;
a longitudinally segmented, generally cylindrical canister on the aft end of said housing including an internal shoulder engaged with the rebated portion ond said housing;
a spring between said housing and said canister urging the segments of said canister apart;
a sleeve over the ends of the segments of said canister in a first axial position and removed from the ends of the segments of said canister in a second axial position;
a sea anchor secured to the aft end of said housing and contained within said canister;
a plug forming a compartment within said housing;
a frangible diaphragm mounted in said plug, one side of said diaphragm being in fluid communication with the exterior of said housing and the other side of said diaphragm being in fluid communication with the compartment within said housing, said diaphragm thereby excluding external pressure from the compartment and being rupturable at a selected pressure for admitting external pressure to said compartment so that the external pressure acts on said piston for changing the compression of a gas in the compartment and obtaining a single rapid, forceful movement of said piston;
a check valve communicating with the compartment within said housing and oriented to permit water to flow from the exterior of said housing to the compartment within said housing and to check reverse flow;
a slidably movable piston within the compartment in said housing dividing the compartment into a first chamber in fluid communication with said diaphragm and with said check valve, and a second chamber closed by the aft end of said housing;
a spring in the compartment urging the piston toward said second chamber;
a check valve in said piston oriented to permit fluid to flow from the first chamber to the second chamber and to check reverse flow; and
a pin interconnecting said piston and said sleeve through the slot in said housing for common axial positioning thereof.

7. An underwater actuated apparatus comprising:
first and second bodies detachably connected to each other;
means for urging detachment of said bodies;
latching means mounted for movement between a first position wherein the bodies are secured to each other by the latching means and a second position wherein the bodies are free to be detached by said urging means;
locking means for holding said latching means in said first position; and
means suddenly responsive to a preselected change in water pressure for disabling the locking means to allow said latching means to move to said second position.

8. An underwater actuator as defined in claim 7 wherein:
said second body has at least a portion around the periphery of a portion of said first body; and
said latching means has a movable peripheral portion for detachably securing said first and second bodies.

9. An underwater actuator as defined in claim 8 wherein the peripheral portion of said latching means comprises a plurality of radially movable balls releasably securing said first and second bodies; and
said locking means comprises a ball retainer preventing radial movement of said balls.

10. An underwater actuator as defined in claim 8 wherein the peripheral portion of said latching means comprises a slidably movable sleeve releasably securing said first and second bodies; and
said locking means comprises a spring biased piston connected to said slidably movable sleeve.

11. A method for operating the means for disabling of the apparatus of claim 7 comprising:
enclosing a volume of gas at substantially atmospheric pressure in a first closed chamber having a slidably movable wall;
enclosing a volume of fluid at substantially atmospheric pressure in a second closed chamber on the opposite side of the slidably movable wall;

enclosing a volume of fluid at substantially atmospheric pressure in a second closed chamber on the opposite side of the slidably movable wall;

sinking the first and second chambers in an underwater environment so that external pressure is raised above atmospheric pressure; and rupturing a frangible diaphragm at a selected distance below the surface of the water so that the external pressure is rapidly admitted to the second chamber for acting on the piston and compressing the gas in the first chamber.

12. A method as defined in claim 11 having additional steps preceding the steps of rupturing a diaphragm comprising:

admitting increasing underwater pressure to the first and second chambers;

raising the first and second chambers in the underwater environment so that external pressure is lowered toward atmospheric pressure; and maintaining increased pressure in the first and second chambers.

13. An underwater pop-up vehicle including an apparatus as defined in claim 7 wherein said means for disabling comprises:

a housing having a cylindrical bore;

a piston movably mounted in the bore of said housing sealably dividing the bore into a first closed chamber on one side of said piston and a second closed chamber on the other side of said piston;

a frangible diaphragm in said housing adjacent the second chamber for excluding external pressure from the second chamber, said diaphragm being rupturable at a selected pressure for admitting external pressure to said second chamber so that the external pressure acts on said piston for changing the compression of the gas in the first chamber and obtaining a single rapid forceful movement of said piston;

a first check valve for admitting underwater pressure through the housing to the first chamber and oriented so that deeper water pressure is retained in the first chamber as the actuator rises to shallow depths; and a second check valve for admitting underwater pressure to the second chamber and oriented so that deeper water pressure is retained in the second chamber as the actuator rises to shallow depths.

14. An underwater vehicle according to claim 15 wherein:

said first body comprises a generally cylindrical hollow housing having an open forward end and a closed aft end, an external circumferential rebated portion near the aft end of said housing, and a radial slot through one side of said housing;

said second body comprises a longitudinally segmented, generally cylindrical canister on the aft end of said housing including an internal shoulder engaged with the rebated portion on said housing;

said means for urging detachment comprises a spring between said housing and said canister urging the segments of said canister apart;

said latching means comprises a sleeve over the ends of the segments of said canister in a first axial position and removed from the ends of the segments of said canister in a second axial position;

said locking means comprising a spring in the compartment urging the piston toward said second chamber; and said means for disabling comprises:

a plug forming a compartment within said housing;

a frangible diaphragm mounted in said plug, one side of said diaphragm being in fluid communication with the exterior of said housing and the other side of said diaphragm being in fluid communication with the compartment within said housing;

a check valve commmunicating with the compartment within said housing and oriented to permit water to flow from the exterior of said housing to the compartment within said housing and to check reverse flow;

a slidably movable piston within the compartment in said housing dividing the compartment into a first chamber in fluid communication with said diaphragm and with said check valve, and a second chamber closed by the aft end of said housing;

a check valve in said piston oriented to permit fluid to flow from the first chamber to the second chamber and to check reverse flow; and a pin interconnecting said piston and said sleeve through the slot in said housing for common axial positioning thereof; and further comprising;

a sea anchor secured to the aft end of said housing and contained within said canister.

References Cited

UNITED STATES PATENTS

| | | | |
|---|---|---|---|
| 1,319,282 | 10/1919 | Huber | 102—7 |
| 2,601,245 | 6/1952 | Bowersett | 102—7 |
| 2,892,401 | 6/1959 | Michelson | 102—14 |
| 3,248,939 | 5/1966 | Silverstein | 73—170 |
| 3,326,226 | 6/1967 | Hinton | 137—63 |

S. CLEMENT SWISHER, *Primary Examiner.*

U.S. Cl. X.R.

9—8